US011794837B2

United States Patent
Katagiri et al.

(10) Patent No.: US 11,794,837 B2
(45) Date of Patent: Oct. 24, 2023

(54) STRADDLE TYPE VEHICLE

(71) Applicant: HONDA MOTOR CO., LTD., Tokyo (JP)

(72) Inventors: Kiyoshi Katagiri, Wako (JP); Yoshiyuki Kuroba, Wako (JP); Tsuyoshi Kumasaka, Wako (JP); Hiroshi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 568 days.

(21) Appl. No.: 17/025,347

(22) Filed: Sep. 18, 2020

(65) Prior Publication Data

US 2021/0001944 A1 Jan. 7, 2021

Related U.S. Application Data

(63) Continuation of application No. PCT/JP2018/013420, filed on Mar. 29, 2018.

(51) Int. Cl.
*B62J 6/05* (2020.01)
*B62J 45/41* (2020.01)
*B62J 6/057* (2020.01)
*B62J 6/055* (2020.01)
*B62J 27/00* (2020.01)

(52) U.S. Cl.
CPC ............. *B62J 6/05* (2020.02); *B62J 6/055* (2020.02); *B62J 6/057* (2020.02); *B62J 27/00* (2013.01); *B62J 45/41* (2020.02)

(58) Field of Classification Search
CPC ...... B62J 6/05; B62J 6/055; B62J 45/41; B62J 6/057; B62J 27/00
See application file for complete search history.

(56) References Cited

U.S. PATENT DOCUMENTS

| 9,457,753 | B2 | 10/2016 | Freienstein et al. | |
| 10,166,909 | B2* | 1/2019 | Suzuki | B62K 11/04 |
| 10,562,477 | B2* | 2/2020 | Fuchs | G08G 1/167 |
| 10,562,582 | B2 | 2/2020 | Mizuno et al. | |
| 10,967,780 | B2* | 4/2021 | Heimrath | G01S 7/4972 |
| 2006/0181759 | A1* | 8/2006 | Malhas | B60R 1/025 359/265 |

(Continued)

FOREIGN PATENT DOCUMENTS

JP 2001151016 A * 6/2001
JP 2001151016 A 6/2001

(Continued)

OTHER PUBLICATIONS

German Office Action for German Patent Application No. 112018007390.4 dated Jan. 12, 2023 (partially translated).

(Continued)

*Primary Examiner* — Tony H Winner
*Assistant Examiner* — Michael R Stabley
(74) *Attorney, Agent, or Firm* — Thomas | Horstemeyer, LLP

(57) ABSTRACT

There is provided with a straddle type vehicle. A direction indicator is formed to project outward in a vehicle width direction and shows a traveling direction of the vehicle. A sensing device detects an obstacle around the vehicle using an ultrasonic wave. The sensing device is arranged in a distal end portion of the direction indicator.

4 Claims, 7 Drawing Sheets

(56) References Cited

U.S. PATENT DOCUMENTS

| | | | |
|---|---|---|---|
| 2009/0021582 A1* | 1/2009 | Nakaya | H04N 7/18 |
| | | | 348/148 |
| 2014/0260772 A1 | 9/2014 | Dion | |
| 2015/0329072 A1 | 11/2015 | Freienstein et al. | |
| 2017/0327177 A1 | 11/2017 | Mizuno et al. | |

FOREIGN PATENT DOCUMENTS

| | | | | |
|---|---|---|---|---|
| JP | 2009-154637 A | | 7/2009 | |
| JP | 2010030471 A | | 2/2010 | |
| JP | 2010071417 A | | 4/2010 | |
| JP | 2015067239 A | * | 4/2015 | |
| JP | 2015067239 A | | 4/2015 | |
| JP | 2016503503 A | | 2/2016 | |
| JP | 2017202809 A | | 11/2017 | |
| KR | 10-2006-0001757 A | | 1/2006 | |
| WO | 2014079697 A1 | | 5/2014 | |
| WO | 2019186945 A1 | | 10/2019 | |

OTHER PUBLICATIONS

International Search Report for PCT/JP2018/013420 dated May 15, 2018.
IPRP for PCT/JP2018/013420 dated Jan. 10, 2020.
German Office Action for German Patent Application No. 112018007390.4 dated Sep. 26, 2022 (partially translated).

* cited by examiner

STRADDLE TYPE VEHICLE

CROSS-REFERENCE TO RELATED APPLICATION(S)

This application is a continuation of International Patent Application No. PCT/JP2018/0134120 filed on Mar. 29, 2018, the entire disclosures of which is incorporated herein by reference.

BACKGROUND OF THE INVENTION

Field of the Invention

The present invention relates to a straddle type vehicle.

Description of the Related Art

A straddle type vehicle including a sensing device on a side of a vehicle main body is known as a straddle type vehicle including a sensing device for detecting obstacles around the vehicle (for example, Japanese Patent Laid-Open No. 2016-503503).

SUMMARY OF THE INVENTION

When the sensing device is provided on the side of the vehicle main body, the detection range may be blocked by a mirror, a handle, the arm or the clothing of the driver, or the like positioned outside the sensing device in the vehicle width direction. If the detection range is blocked, the detection accuracy of the sensing device is decreased.

An aspect of the present invention provides a straddle type vehicle capable of improving the detection accuracy of the sensing device.

According to first aspect of the present invention, a straddle type vehicle comprises a direction indicator formed to project outward in a vehicle width direction and configured to show a traveling direction of the vehicle, and a sensing device configured to detect an obstacle around the vehicle using an ultrasonic wave, wherein the sensing device is arranged in a distal end portion of the direction indicator, wherein the distal end portion of the direction indicator has a recess opened to the outside in the vehicle width direction or opened to the rear in a vehicle longitudinal direction, wherein at least a part of the sensing device is provided in the recess, and wherein the direction indicator has a hollow housing a light source.

According to second aspect of the present invention, wherein at least a part of an inner wall of the recess extends outward in the vehicle width direction or backward in the vehicle longitudinal direction more than the sensing device.

According to third aspect of the present invention, the straddle type vehicle further comprises a fixing portion on a side of a vehicle main body, and an elastic member configured to elastically support the direction indicator on the fixing portion, wherein the elastic member has a communication portion configured to allow an inside and an outside of the direction indicator to communication with each other.

According to fourth aspect of the present invention, the straddle type vehicle further comprises a vibration damping member interposed between the distal end portion and the sensing device.

According to fifth aspect of the present invention, wherein the direction indicator has a rod-shaped main body projecting outward in the vehicle width direction, and has a light source in the main body.

Further features of the present invention will become apparent from the following description of exemplary embodiments (with reference to the attached drawings).

Advantageous Effects of Invention

According to the first aspect, the sensing device is installed outside the side surface of the vehicle main body, so that it is possible to suppress blocking of the emission of an ultrasonic wave by the driver or a component of the vehicle. Therefore, it is possible to provide a straddle type vehicle that can improve the detection accuracy of the sensing device.

Also, according to the first aspect, since at least a part of the sensing device is arranged in the recess, the exposed range of the sensing device 50 is decreased and the sensing device 50 can be protected.

According to the second aspect, an ultrasonic wave emitted from the sensing device is reflected by the inner wall, so that it is possible to emit the ultrasonic wave to the target detection range. In addition, since the inner wall decreases the emission angle of the ultrasonic wave, the ultrasonic wave is amplified, and the sensing performance of the sensing device can be improved.

According to the third aspect, the elastic member includes a communication hole portion, so that the performance of dissipating the heat from the light source and the sensing device in the direction indicator can be improved. Therefore, it is possible to prevent a decrease in detection accuracy of the sensing device 50 caused by the high temperature.

According to the fourth aspect, the sensing device is provided in the direction indicator via the vibration damping member. This can suppress a vibration of the direction indicator to be transmitted to the sensing device. Therefore, it is possible to prevent a decrease in detection accuracy of the sensing device caused by the vibration.

According to the fifth aspect, the sensing device is provided in the distal end portion of the direction indicator having a rod shape. This makes it possible to arrange the sensing device further outside in the vehicle width direction, so that it is possible to suppress blocking of the emission of an ultrasonic wave by the driver or a component of the vehicle. Therefore, the detection accuracy of the sensing device can be improved.

DESCRIPTION OF THE EMBODIMENTS

A straddle type vehicle according to an embodiment of the present invention will be explained below with reference to the accompanying drawings. In each drawing, arrows X, Y, and Z indicate directions perpendicular to each other. The X direction indicates the front-and-rear direction of the straddle type vehicle, the Y direction indicates the vehicle width direction (left-and-right direction) of the straddle type vehicle, and the Z direction indicates the vertical direction. The front or rear in the front-and-rear direction of the straddle type vehicle will simply be called the front or rear in some cases. Also, the inside or outside in the vehicle width direction (left-and-right direction) of the straddle type vehicle will simply be called the inside or outside in some cases. Furthermore, when a pair of left and right parts are explained by taking one of them as an example, the other part is not shown or an explanation thereof will be omitted in some cases.

Outline of Straddle Type Vehicle

Figure 1:
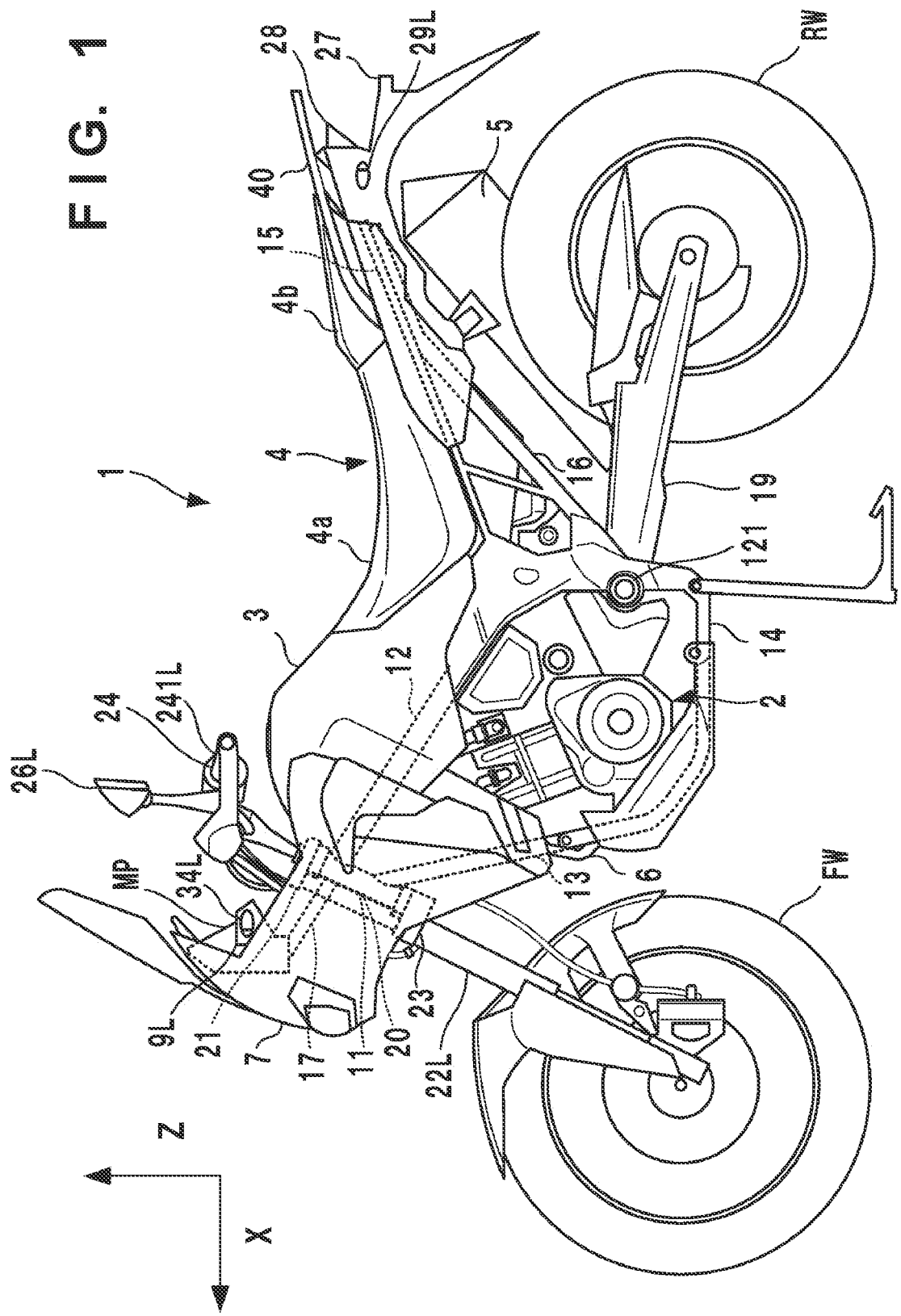
FIG. 1 is a left side view of a straddle type vehicle according to an embodiment.
Figure 2:
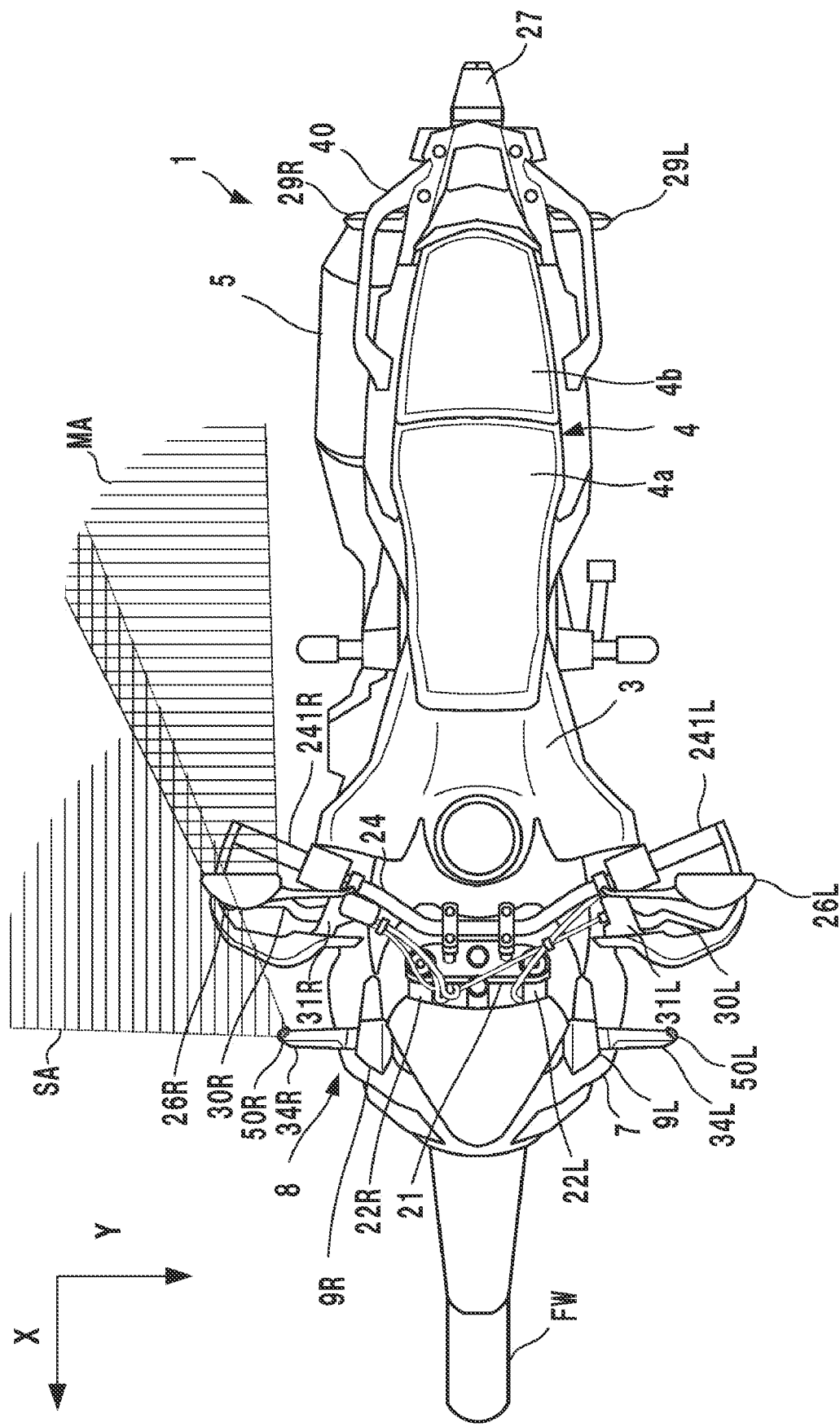
FIG. 2 is a plan view of the straddle type vehicle shown in FIG. 1.

FIG. 1 is a left side view of a straddle type vehicle 1 according to the embodiment of the present invention. FIG. 2 is a plan view of the straddle type vehicle 1. The straddle type vehicle 1 is an off-road motorcycle. However, the present invention is applicable to various kinds of straddle type vehicles including motorcycles of other forms. The present invention is also applicable to a vehicle including an internal-combustion engine as a driving source, and an electric vehicle including a motor as a driving source. In the following description, the straddle type vehicle 1 will sometimes be called the vehicle 1.

As a vehicle body frame, the vehicle 1 includes a head pipe 11 formed in the front part of the vehicle, a pair of left and right main frames 12, a down frame 13, a pair of left and right lower frames 14, and an extended portion 17. Each of the head pipe 11 and the down frame 13 is a single member formed along the center of the vehicle body.

The main frames 12, the down frame 13, and the lower frames 14 are connected into the form of a loop, and a power unit 2 is arranged inside a region surrounded by them. The power unit 2 includes an engine and a transmission. An exhaust pipe 6 for guiding the exhaust gas of the engine to an exhaust muffler 5 is formed in front of the power unit 2.

The main frames 12 have a portion that branches into left and right parts, are attached to the upper portion of the head pipe 11, and obliquely extend downward and backward by curving to the left and right above the power unit 2. The down frame 13 is attached to the lower portion of the head pipe 11, and extends downward in front of the power unit 2 by linearly and obliquely descending in the center of the vehicle body, and the lower end portion thereof is connected to the front end portions of the pair of left and right lower frames 14. The pair of left and right lower frames 14 curve from the front lower portions of the power unit 2 to below the power unit 2 and almost linearly extend backward, and the rear end portions thereof are connected to the lower end portions of the pair of left and right main frames 12.

A fuel tank 3 supported by the main frames 12 is arranged above the power unit 2. A seat 4 is arranged immediately behind the fuel tank 3. The seat 4 includes a seat front part 4a on which a driver sits and a seat rear part 4b on which a passenger sits, and is supported on a pair of left and right seat frames 15. The pair of left and right seat frames 15 include front ends attached to the pair of left and right main frames 12, and are extended backward. A pair of left and right rear frames 16 are connected to the seat frames 15 and the main frames 12.

A rear fender 27 for preventing splash of mud or rainwater by a rear wheel RW is supported behind the seat frames 15. A brake lamp 28 and a pair of left and right direction indicators 29L and 29R are attached to the rear fender 27 as lighting components on the rear side of the vehicle body, and a lighting operation is performed based on an operation by the driver. In this embodiment, the direction indicators 29L and 29R are bar type turn signals that project to the left and right sides.

A grip 40 to be gripped by the passenger is formed backward from the side portions of the seat rear part 4b. The grip 40 is supported by the seat frames 15. Carriers (not shown) for storing baggage and the like can be attached to the side portions and the rear end of the grip 40.

A steering stem 20 is pivotally supported by the head pipe 11, and a top bridge 21 is attached to the upper end portion of the steering stem 20. A bottom bridge 23 is attached to the lower end portion of the steering stem 20.

A pair of left and right front forks 22L and 22R are supported by fork insertion holes (not shown) in the left and right end portions of the top bridge 21. The pair of front forks 22L and 22R are also supported by the bottom bridge 23.

The pair of front forks 22L and 22R will also be called front forks 22 (this applies to all pairs of left and right members hereinafter). A front wheel FW is rotatably supported by the lower end portions of the front forks 22, and steered by a handle bar 24 attached to the top bridge 21, Grips 241L and 241R to be gripped by the driver are formed at the left and right end portions of the handle bar 24. In addition, brake levers 30L and 30R, and brake master cylinders 31L and 31R interconnected to the brake levers 301, and 30R, are formed adjacent to the grips 241L and 241R. Furthermore, mirrors 26L and 26R extending outside in the vehicle width direction are formed inside the grips 241L and 241R of the handle bar 24. As shown in FIG. 2, the driver can visually recognize, using the mirror 26R, a visible range MA extending from the side to the rear.

The extended portion 17 is so formed as to extend forward from the head pipe 11, and supports a meter panel MP. The meter panel MP is a display device that displays various kinds of information, for example, the vehicle statuses such as the vehicle speed and the engine speed, and notification to the driver. In addition, a pair of left and right cowl support stays 9 are provided on the extended portion 17 so as to be positioned outside in the vehicle width direction. A front cowl 7, that is formed from the front part to the side parts of the meter panel MP, the front forks 22, and the like and arranged so as to cover these members is supported by the cowl support stays 9. Further, a pair of left and right direction indicators 34L and 34R are so formed as to project outside in the vehicle width direction from the sides of the cowl support stays 9. In this embodiment, the direction indicators 34L and 34R are bar type turn signals similar to the direction indicators 29L and 29R on the rear side of the vehicle body.

The front end portion of a rear swing arm 19 is swingably supported by the main frames 12L and 12R by using a pivot shaft 121. The rear wheel RW is supported by the rear end portion of the rear swing arm 19, and rotated by a chain (not shown) wound around a drive sprocket (not shown) of the power unit 2 and a driven sprocket (not shown) of the rear wheel RW.

Details of Sensing Device

Figure 3:
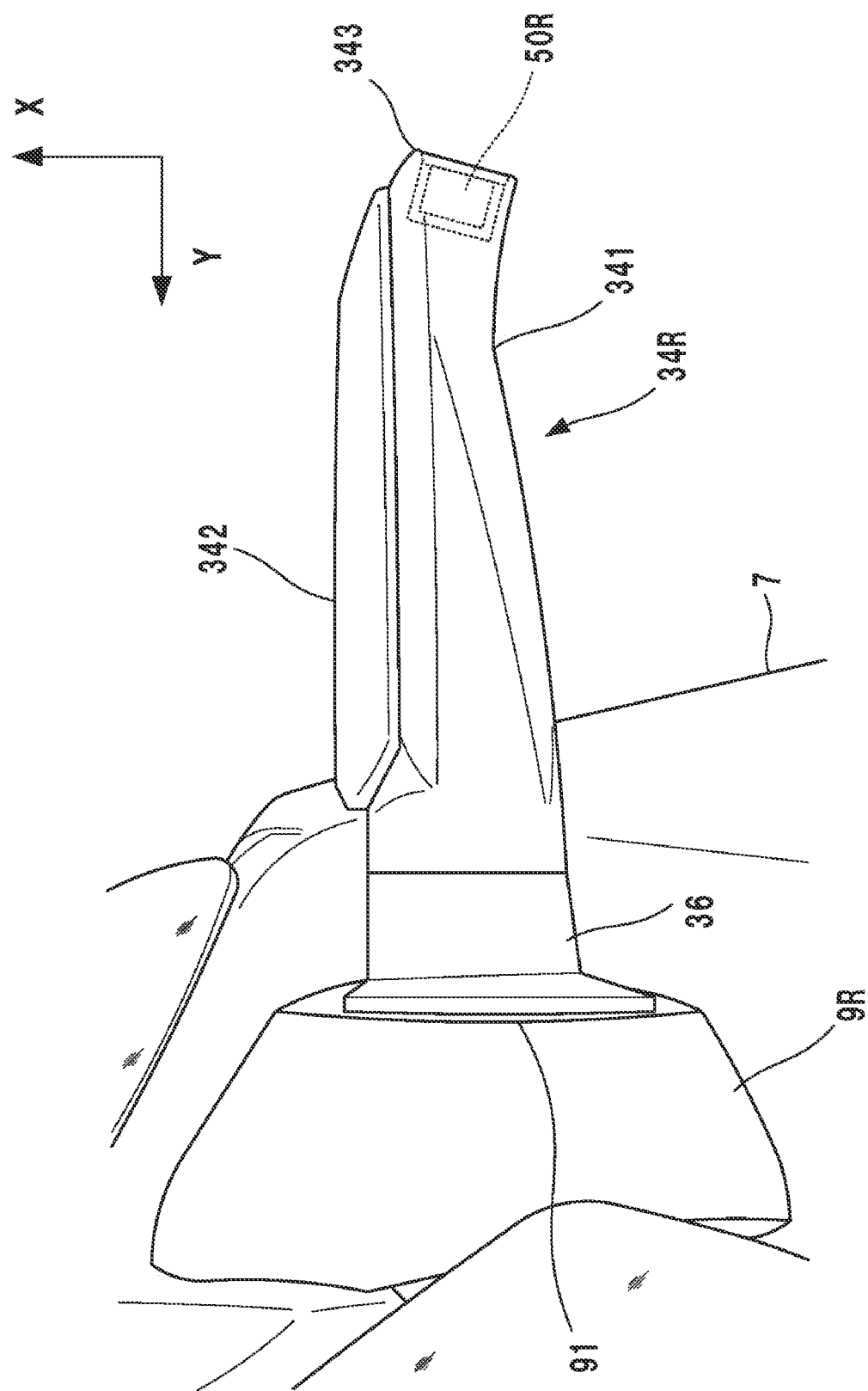
FIG. 3 is an enlarged view of a right front direction indicator shown in FIG. 2.
Figure 4:
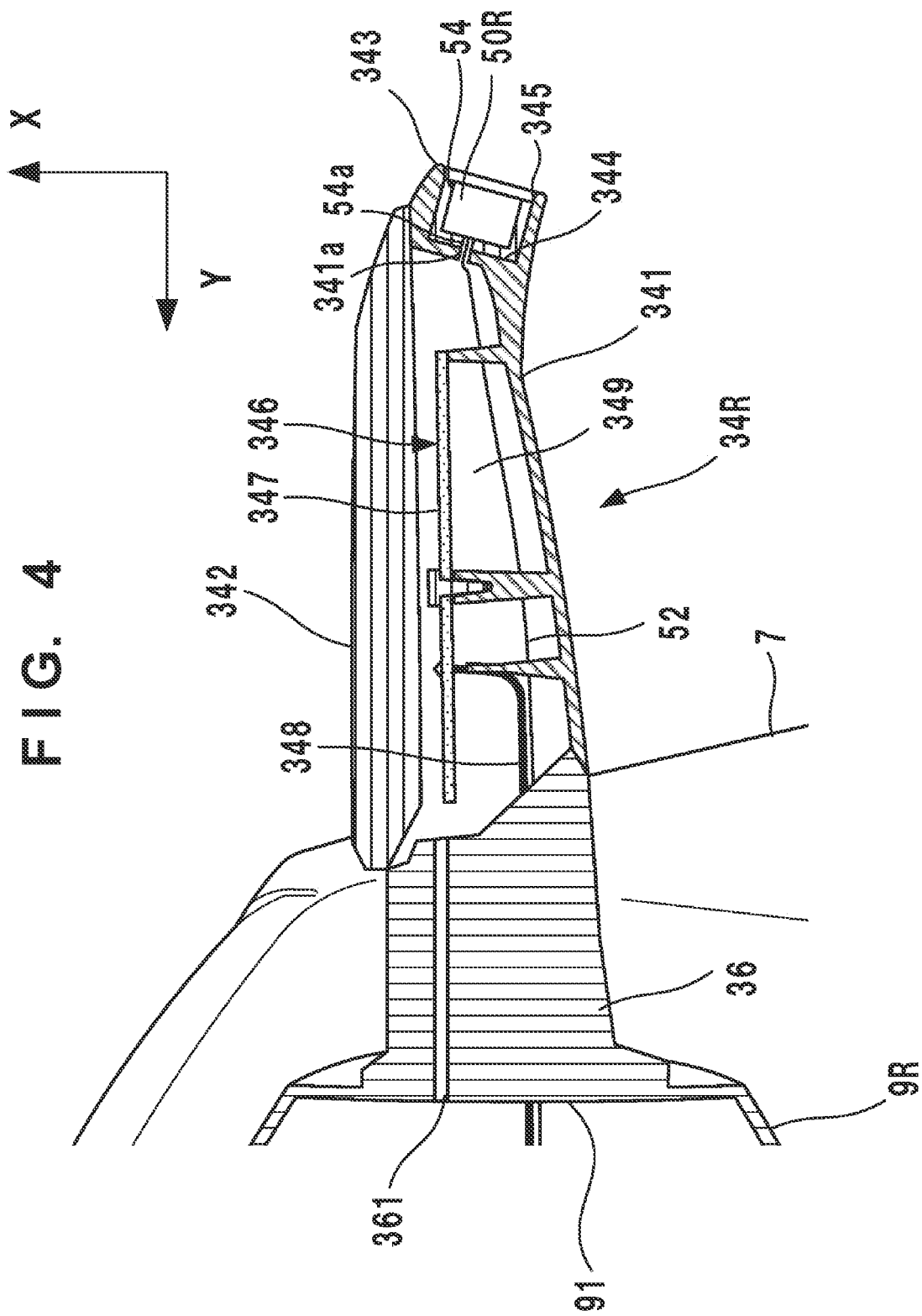
FIG. 4 is a sectional view of the direction indicator shown in FIG. 3 when viewed from above.

Next, details of a sensing device 50R according to this embodiment will be explained with reference to FIGS. 1 to 4. FIG. 3 is an enlarged view of a portion around the right direction indicator 34R of the straddle type vehicle 1, and FIG. 4 is a sectional view of the direction indicator 34R when viewed from above. Although the direction indicator 34R will be explained here as an example, the direction indicator 34L can have the similar arrangement.

The sensing device 50R is arranged in a distal end portion 343 of the direction indicator 34R. The sensing device 50 can detect obstacles around the vehicle 1, and is an integrated transmitter/receiver type ultrasonic sensor (sonar) in this embodiment.

As shown in FIG. 2, the distal end portion 343 of the direction indicator 34R is positioned outside the vehicle main body 8 including the fuel tank 3 and the front cowl 7 in the vehicle width direction. Therefore, the sensing device 50R is positioned outside the vehicle main body 8 in the vehicle width direction.

The sensing device 50R can detect obstacles such as nearby vehicles in a detection range SA. The detection range SA may be defined in relation to, for example, the visible range MA of the mirror 26. By defining the detection range SA outside the visible range MA of the mirror, it is possible to detect a nearby vehicle in a range of the blind spot of the driver.

The direction indicator 34R in which the sensing device 50R is arranged is so formed as to project outward in the vehicle width direction from the cowl support stay 9. In this embodiment, the direction indicator 34R is supported on a fixing portion 91 of the cowl support stay 9 via an elastic member 36.

The direction indicator 34R includes a main body 341, a light source 346 housed in a hollow 349 of the main body 341, and a lens 342 which is arranged in front of the main body 341 and transmits light emitted from the light source 346. In this embodiment, the light source 346 is formed by arranging one or a plurality of LED elements (not shown) on a board 347. The board 347 is connected to a control unit 64 (to be described later) via an electric harness 348.

The main body 341 includes, in the distal end portion 343, a recess 344 opened to the outside in the vehicle width direction or opened to the rear in the vehicle longitudinal direction, and the sensing device 50R is provided in the recess 344. In this embodiment, the entire sensing device 50R is provided in the recess 344, but it is also possible to adopt an arrangement in which a part of the sensing device 50R is arranged in the recess 344.

When arranging the sensing device 50 in the recess 344, a vibration damping member 54, for example, an elastic member such as antivibration rubber may be interposed. By interposing the vibration damping member 54, it is possible to suppress a vibration to be transmitted to the sensing device 50 and prevent a decrease in detection accuracy of the sensing device 50.

In this embodiment, an inner wall 345 forming the inner surface of the recess 344 is formed such that its entire circumference extends outside the sensing device 50R in the vehicle width direction. However, the arrangement of the inner wall 345 is not limited to this, and the inner wall 345 may be so formed as to partially extend outside in the vehicle width direction. In addition, in accordance with the detection range of the sensing device 50R, the inner wall 345 may be so formed as to not only extend outside of the sensing device 50R in the vehicle width direction but also extend backward in the vehicle longitudinal direction. By matching the detection range of the sensing device 50R and the extending direction of the inner wall 345, the ultrasonic wave emitted in the direction outside the detection range is reflected by the inner wall 345, so that the ultrasonic wave can be emitted only to the detection range.

The vehicle 1 further includes an electric harness 52 for connecting the sensing device 50 to the control unit 64. The electric harness 52 extends from the sensing device 50 to the control unit 64 through the hollow 349. Holes 341a and 54a are formed in the main body 341 and the vibration damping member 54 so as to connect to the hollow 349 from the recess 344. The electric harness 52 connected to the sensing device 50 extends to the hollow 349 through the holes 341a and 54a. Since the electric harness 52 passes through the hollow 349 as described above, it is possible to share the routing with the electric harness 348 of the board 347.

The elastic member 36 is interposed between the fixing portion 91 and the direction indicator 34R to prevent the direction indicator 34R from being broken at the time of a collision or a fall. The elastic member 36 includes a communication portion 361 that allows the inside and outside of the main body 341 of the direction indicator 34R to communicate with each other. In this embodiment, the communication portion 361 is a communication hole that allows the inside of the main body 341 and the inside of the cowl support stay 9 to communicate with each other. Since the heat from the light source 346 is dissipated from the communication portion 361, it is possible to prevent a temperature rise around the sensing device 50R and prevent a decrease in detection accuracy of the sensing device 50. In addition, the elastic member 36 includes a harness passage (not shown) for guiding the electric harnesses 348 and 52 connected to the board 347 and the sensing device 50R, respectively, to the inside of the cowl support stay 9, and the communication portion 361 and the harness passage (not shown) may be made common. Note that the communication portion 361 is only required to allow the hollow 349 to communicate with the outside. For example, a notch or the like may be provided at a position where the elastic member 36 and the main body 341 are in contact with each other to allow the hollow 349 to communicate with the outside.

Figure 5:
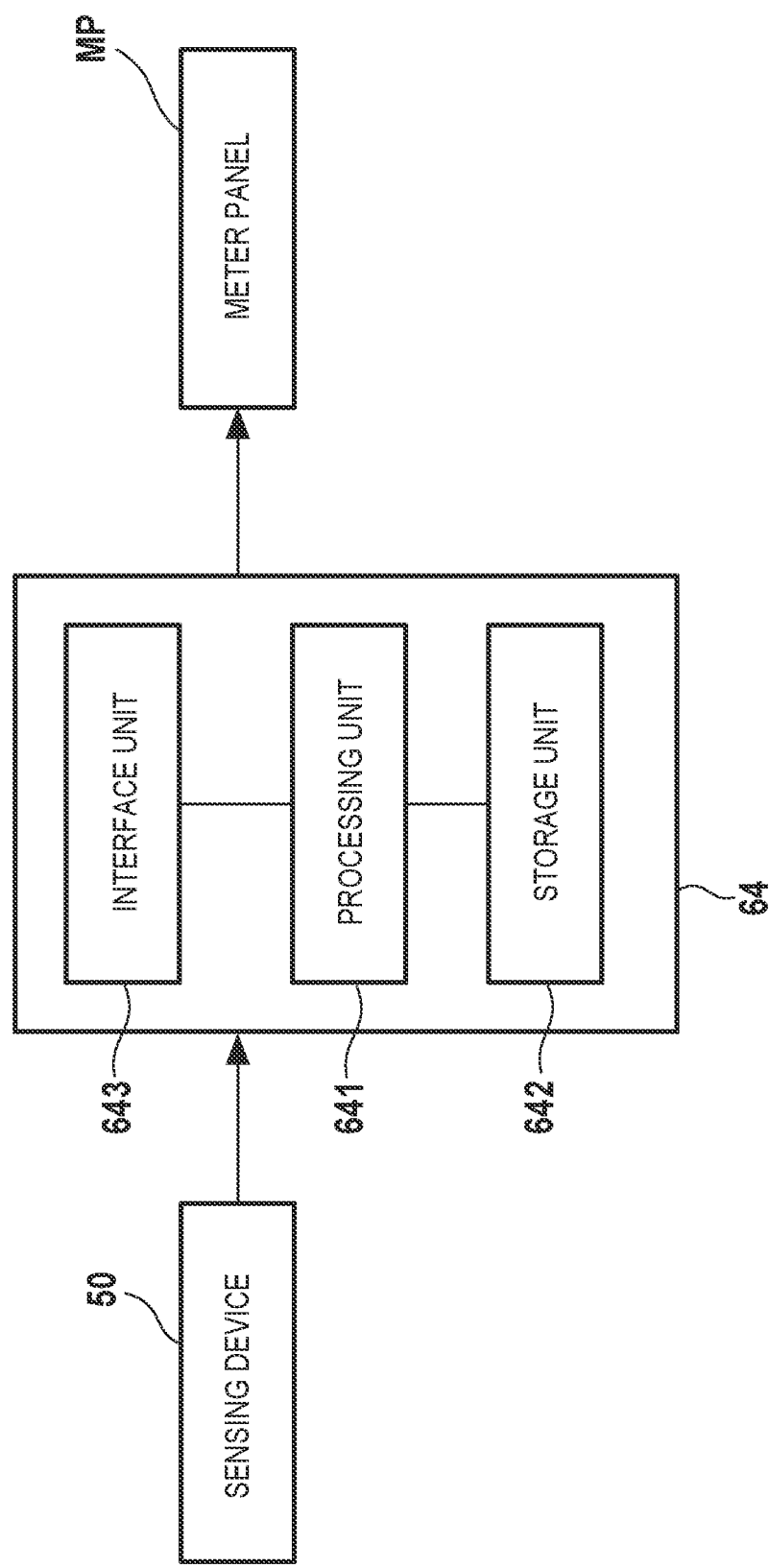
FIG. 5 is a block diagram of a control system of the straddle type vehicle according to the embodiment.

FIG. 5 is a block diagram of the control system of the vehicle 1, particularly, a block diagram of the control unit 64 for controlling the sensing device 50 and the meter panel MP. The control unit 64 causes the meter panel MP to also function as a notification unit that displays information of the periphery of the vehicle, and controls the display based on the detection result of the sensing device 50. The control unit 64 includes a processing unit 641, a storage unit 642 such as a RAM or a ROM, and an interface unit 643 for relaying exchange of signals between an external device and the processing unit 641. The processing unit 641 is a processor such as a CPU and executes programs stored in the storage unit 642. The storage unit 642 stores the programs to be executed by the processing unit 641, and various kinds of data. The interface unit 643 receives the detection result from the sensing device 50 via a signal processing circuit (not shown).

An example of processing to be executed by the processing unit 641 will be explained. As basic processing, the processing unit 641 determines the presence/absence of an obstacle such as a nearby vehicle based on the input detection result from the sensing device 50. If the processing unit 641 determines that there is an obstacle in the periphery, the processing unit 641 notifies the driver by displaying the information on the meter panel MP. For example, the meter panel MP turns on an indicator lamp indicating the approach of the nearby vehicle, or displays characters indicating the approach of the vehicle on the display surface of the meter panel MP.

On the other hand, if the processing unit 641 determines that the input detection result from the sensing device 50 is an abnormal value or there is an obstacle within a predetermined distance, the processing unit 641 performs notification that encourages the driver to ask the passenger not to cover the sensing device 50. The predetermined distance can also be set at, for example, a distance at which the hand or the clothing of the passenger may cover the sensing device 50. In this case, the processing unit 641 causes the meter panel MP to perform display in a form different from that of the basic processing described above. For example, the meter panel MP turns on an indicator lamp different from that of the basic processing, or displays characters that encourage the passenger not to cover the sensing device 50. Thus, when the detection range SA of the sensing device 50 is blocked by, for example, the hand or the clothing of the passenger, the driver is notified of this information, so it is possible to encourage the driver not to block the detection range SA.

As another example of the form of notification to the driver, the vehicle 1 can further include a speaker (not shown) or the like, and this speaker or the like can generate an alarm sound in accordance with an instruction from the control unit 64. It is also possible to combine the indicator and the alarm sound. By generating the alarm sound by using the speaker or the like, it is possible to directly notify the passenger, instead of the driver, that the sensing device 50 is covered.

Effects of this Embodiment

As has been described above, according to this embodiment, the sensing device 50 is installed outside the side surface of the vehicle main body 8 in the vehicle width direction, so that it is possible to suppress blocking of the emission of an ultrasonic wave by the driver or a component of the vehicle. Further, the arrangement position of the sensing device 50 from the road surface is higher than that in a case of arranging the sensing device 50 on the side surface of the vehicle main body, so that noise produced by the reflection from the road surface can be suppressed. Furthermore, the passage of the harness for the light source of the direction indicator and the passage of the harness for the sensing device can be made common.

In addition, since the sensing device 50 is arranged in the recess 344, the exposed range of the sensing device 50 is decreased and the sensing device 50 can be protected. Further, since an ultrasonic wave emitted from the sensing device 50 is reflected by the inner wall, it is possible to emit the ultrasonic wave to the target detection range. Furthermore, since the inner wall decreases the emission angle of the ultrasonic wave, the ultrasonic wave is amplified, and the sensing performance can be improved.

In addition, since the elastic member 36 includes the communication portion 361, it is possible to improve the performance of dissipating the heat from the light source and the sensing device 50 in the direction indicator. Therefore, it is possible to prevent a decrease in detection accuracy of the sensing device 50 caused by the high temperature. Further, since the sensing device 50 is provided in the direction indicator 34 via the vibration damping member 54, it is possible to suppress the vibration of the direction indicator 34 to be transmitted to the sensing device 50.

OTHER EMBODIMENTS

Figure 6:
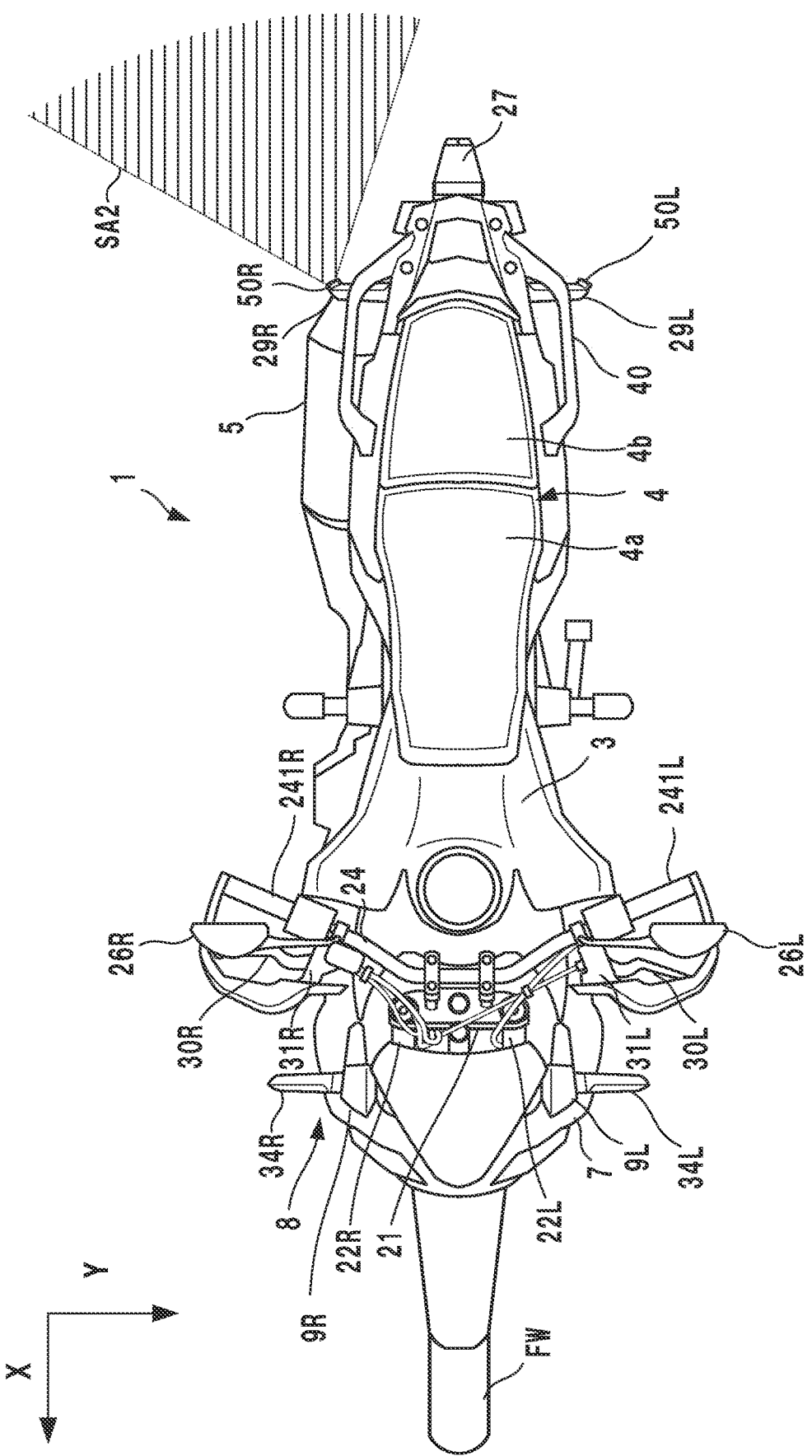
FIG. 6 is a plan view showing the layout of sensing devices according to another embodiment.

In the above-described embodiment, the arrangement has been explained in which the sensing device 50R is arranged in the front direction indicator, but it is also possible to adopt an arrangement in which the sensing device 50R is arranged in the rear direction indicator. FIG. 6 is a plan view showing the layout of sensing devices 50 according to another embodiment. The detection range of the sensing device 50 is denoted by SA2. By arranging the sensing device 50 in a rear direction indicator 29, it is possible to detect the presence/absence of a nearby vehicle in a range extending from the side of the vehicle to the rear.

Figure 7:
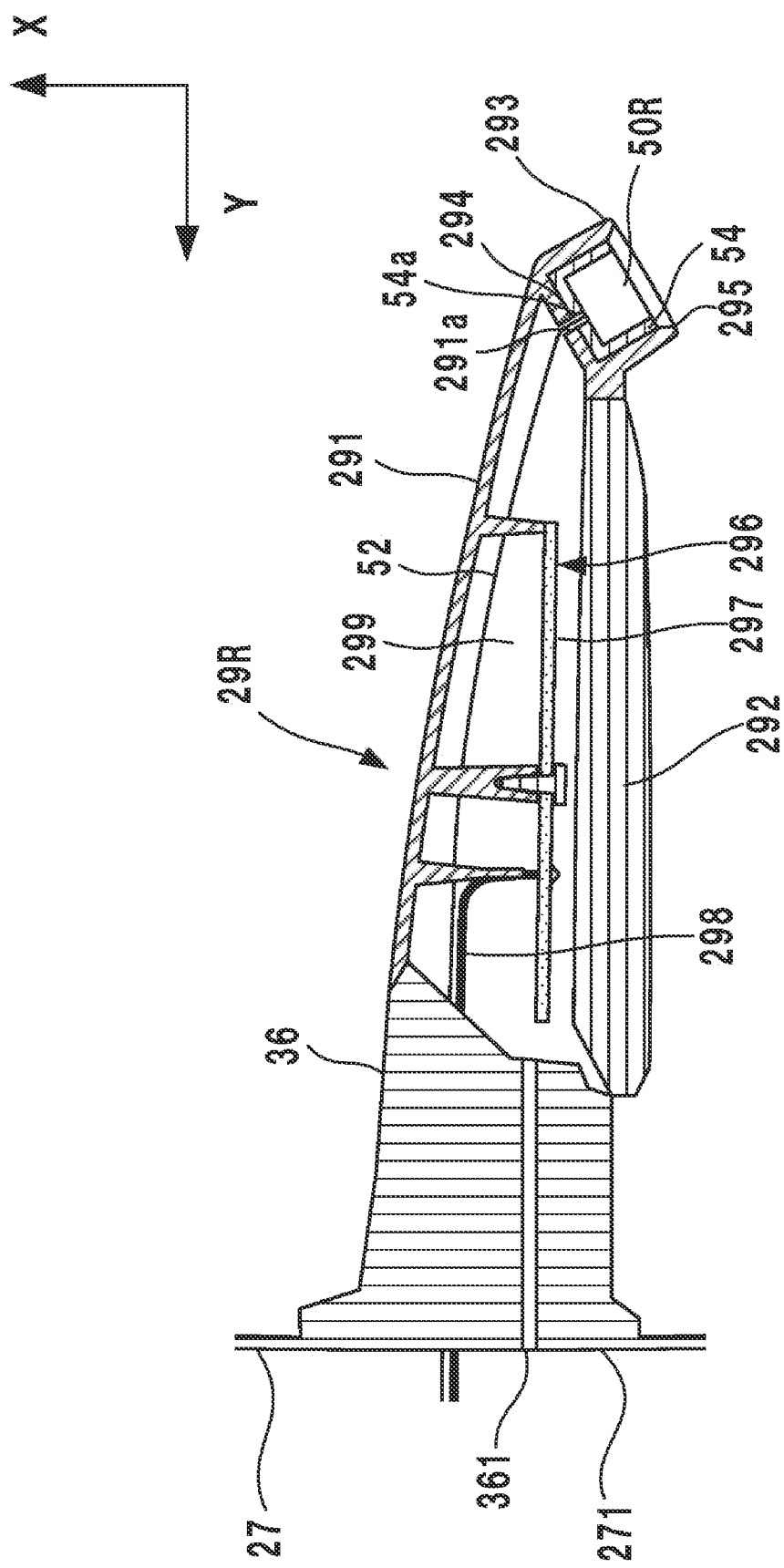
FIG. 7 is a sectional view of a right rear direction indicator shown in FIG. 6 when viewed from above.

FIG. 7 is a sectional view of the direction indicator 29R when viewed from above. The sensing device 50R is arranged in a distal end portion 293 of the direction indicator 29R. The direction indicator 29R includes a main body 291, a light source 296 housed in a hollow 299 of the main body 291, and a lens 292 which is arranged in front of the main body 291 and transmits light emitted from the light source 296. The direction indicator 29R is supported by a rear fender 27 via an elastic member 36. In this embodiment, the light source 296 is formed by arranging one or a plurality of LED elements (not shown) on a board 297. The board 297 is connected to a control unit 64 (to be described later) via an electric harness 298.

The main body 291 includes, in the distal end portion 293, a recess 294 opened to the outside in the vehicle width direction or opened to the rear in the vehicle longitudinal direction, and the sensing device 50R is provided in the recess 294. In this embodiment, the sensing device 50 is provided in the recess 294 via a vibration damping member 54. By interposing the vibration damping member 54, it is possible to suppress a vibration to be transmitted to the sensing device 50 and prevent a decrease in detection accuracy of the sensing device 50R.

An inner wall 295 forming the inner surface of the recess 294 is formed such that its entire circumference extends backward more than the sensing device 50R. Since the sensing device 50R is arranged in the recess 294, the exposed range of the sensing device 50R is decreased and the sensing device 50R can be protected. Further, since an ultrasonic wave emitted from the sensing device 50R is reflected by the inner wall 295, it is possible to emit the ultrasonic wave to the target detection range. Furthermore, since the inner wall 295 decreases the emission angle of the ultrasonic wave, the ultrasonic wave is amplified, and the sensing performance can be improved.

The elastic member 36 includes a communication portion 361 that allows the inside and outside of the main body 291 of the direction indicator 29R to communicate with each other. In this embodiment, the communication portion 361 is a communication hole that allows the inside of the main body 291 and the inside of the rear fender 27 to communicate with each other. Since the heat from the light source 296 is dissipated from the communication portion 361, it is possible to prevent a temperature rise around the sensing device 50R and prevent a decrease in detection accuracy of the sensing device 50R.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A motorcycle comprising:
   a direction indicator formed to project outward in a width direction of the motorcycle and configured to show a traveling direction of the motorcycle; and
   a sensing device configured to detect an obstacle around the motorcycle using an ultrasonic wave, wherein the sensing device is arranged in a distal end portion of the direction indicator, wherein the distal end portion of the direction indicator has a recess opened to the outside in the width direction or opened to the rear in a longitudinal direction of the motorcycle, wherein at least a part of the sensing device is provided in the recess, wherein the direction indicator has a hollow housing a light source, and wherein the motorcycle further comprises a vibration damping member interposed between the distal end portion and the sensing device.

2. The motorcycle according to claim 1, wherein at least a part of an inner wall of the recess extends outward in the width direction or backward in the longitudinal direction more than the sensing device.

3. The motorcycle according to claim 1, further comprising:

a fixing portion on a side of a main body of the motorcycle; and an elastic member interposed between the direction indicator and the fixing portion, wherein the elastic member has a communication portion configured to allow an inside and an outside of the direction indicator to communicate with each other.

4. The motorcycle according to claim 1, wherein the direction indicator has a rod-shaped main body projecting outward in the width direction, and has a light source in the main body.

* * * * *